United States Patent [19]

Hirata et al.

[11] Patent Number: 4,577,538

[45] Date of Patent: Mar. 25, 1986

[54] BACKGAUGE DEVICE

[75] Inventors: Tadashi Hirata; Tadashi Amano, both of Isehara, Japan

[73] Assignee: Amada Company Limited, Japan

[21] Appl. No.: 601,287

[22] Filed: Apr. 17, 1984

[51] Int. Cl.$^4$ .......................... B26D 7/02; B23Q 3/00
[52] U.S. Cl. .................................. 83/467 R; 83/581; 269/319
[58] Field of Search ................. 83/467 R, 467 A, 468, 83/522, 698, 699, 72, 74, 581; 269/303–306, 315–320

[56] References Cited

U.S. PATENT DOCUMENTS

| 1,402,540 | 1/1922 | Rybicki | 83/467 |
|---|---|---|---|
| 3,176,559 | 4/1965 | Kootz | 83/467 X |
| 3,807,269 | 4/1974 | Meites | 83/522 X |
| 3,853,028 | 12/1974 | Jagers | 83/467 X |
| 3,892,155 | 7/1975 | Gerlach | 83/467 X |

Primary Examiner—James M. Meister
Assistant Examiner—John L. Knoble
Attorney, Agent, or Firm—Wigman & Cohen

[57] ABSTRACT

The present invention relates to a backgauge device comprising a plurality of guide members extending substantially parallel to one another, a movable body supported on each guide member so as to be movable in the direction of the guide member, a drive mechanism connected to each guide member for independently moving each of the movable bodies along its respective guide member, a beam member extending transversely to the guide members, the beam member being supported by the movable bodies and said movable bodies being vertically adjustable independently of each other so that the beam member can be adjusted in both a horizontal and oblique manner.

12 Claims, 6 Drawing Figures

BACKGAUGE DEVICE

BACKGROUND OF THE INVENTION

1. Field of the Invention

The present invention relates to a backgauge device, and more specifically, it relates to a backgauge device on a working device such as a shearing machine or press brake and the like, which processes a workpiece of metal plate.

2. Description of the Prior Art

For example, in a shearing machine or press brake or the like, in order to accurately carry out the positioning of a metal plate work piece relative to the working position at which the work is processed by means of upper and lower processing tools, a backgauge device is usually provided which is freely movable in the forward and backward directions with reference to the working position. In the conventional backgauge device there is a pair of guide members which are separated from each other in the left and right direction and extending in the forward and backward directions. On each of these guide members are respectively supported movable members which are freely movable in the forward and backward direction. A beam member, which supports a plurality of work stoppers extending in the left and right direction in order to carry out the predetermined positioning of the workpiece, is fixed near the opposite ends thereof on the previously mentioned movable bodies. In addition, in order to move each movable member in the forward and backward direction along each guide member, right and left ball screws are provided contiguous to each guide member and parallel to the guide members, and a ball nut which is threadably fitted to each ball screw is connected integrally to each of the previously mentioned movable bodies. Furthermore, in order to drive the ball screw rotationally, a servomotor is connected to one ball screw, and the left and right ball screws rotate synchronously, and the left and right ball screws are connectively linked through a gear mechanism or a chain mechanism.

Accordingly, since a plurality of ball screws are rotated by means of one servo-motor, a comparatively large servo-motor is required, and the overall construction is very sturdy and complicated, which is a problem in the prior art working apparatus.

In addition, the left and right movable bodies which are located near the opposite edges of the beam member are capable, by synchronous rotation of the ball screw, of moving simultaneously in the forward and backward directions. For and this reason, it is usually necessary to move the left and right movable bodies while maintaining a uniform and accurate attitude so as not to exert any bending action or unreasonable external force on the supporting section of the beam. Accordingly, the mounted section of the guide member which guides and supports the left and right movable bodies must be processed in a highly precise manner, which is also a problem in the prior art working apparatus.

SUMMARY OF THE INVENTION

Accordingly, the main object of the present invention is to provide a backgauge device with no problems whatsoever, even in the case where a delay is produced in one movable body, when the movable body supporting one end of the beam member which supports the work stopper, and the movable body supporting the other end of the beam member, move as one body in the forward and backward direction.

A second object of the present invention is to provide a backgauge device capable of being moved forward and backward by means of separate drive devices which drive left and right movable bodies.

A third object of the present invention is to provide a backgauge device which is easy to install and adjust without the necessity of precisely mounting the guide member which supports and guides the left and right movable bodies.

Still another object of the present invention is to provide a backgauge device with which it is unnecessary to synchronize and control each individual left and right movable body in movement.

Still another object of the present invention is to provide a backgauge device which is capable of tilting the beam member in the forwrard and backward direction as required.

In the present invention, in order to achieve the objects outlined above, one edge of the beam member is supported in a horizontally rotatable manner by one movable body, while the other edge of the beam member is supported in a longitudinally slidable manner by the other movable body.

BRIEF DESCRIPTION OF THE DRAWINGS

The present invention will be better understood from the detailed description given below, and the accompanying drawings which are given by way of illustration only, and thus are not limitative of the present invention and wherein.

DESCRIPTION OF THE PREFERRED EMBODIMENT

Figure 1:
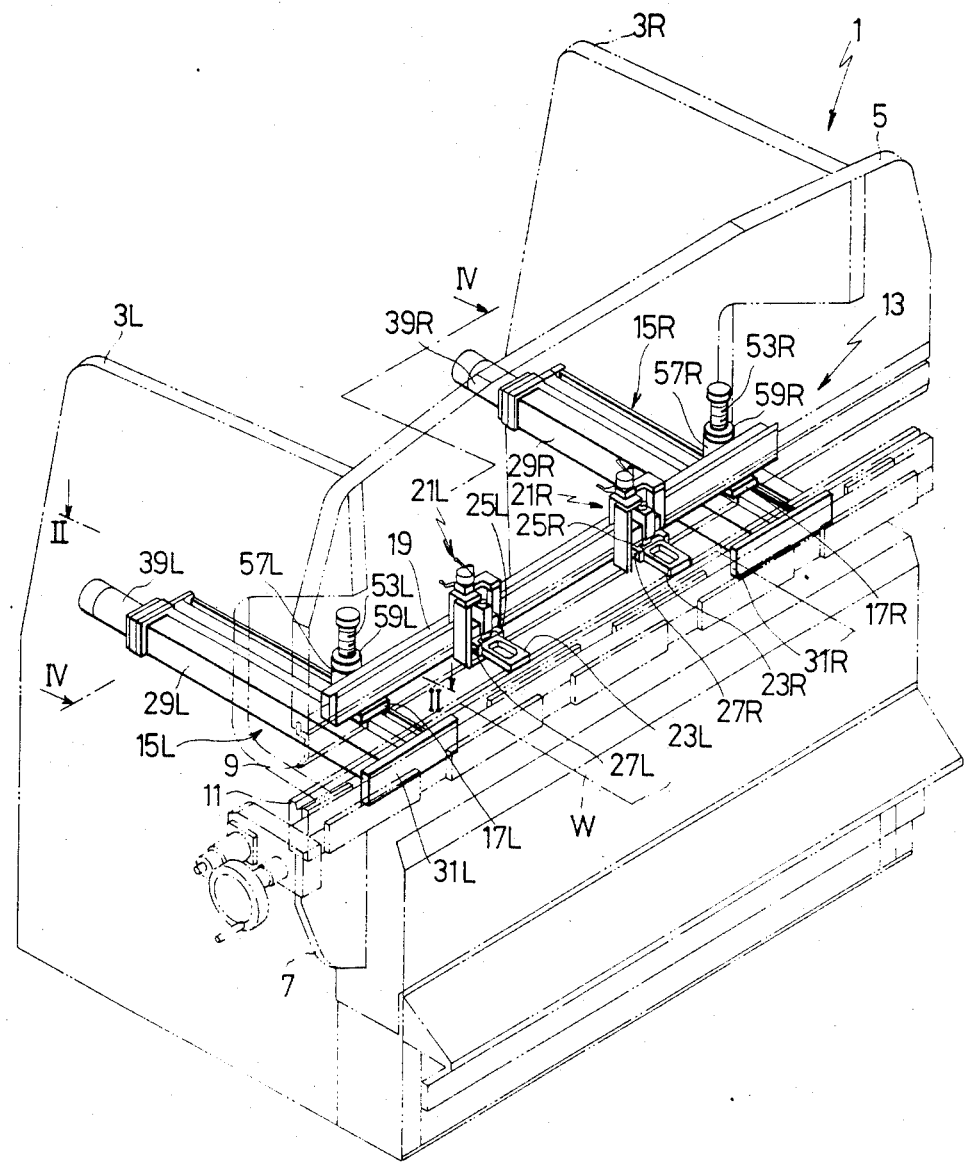
FIG. 1 is a perspective view of a backgauge device operated on a press brake.
Figure 2:
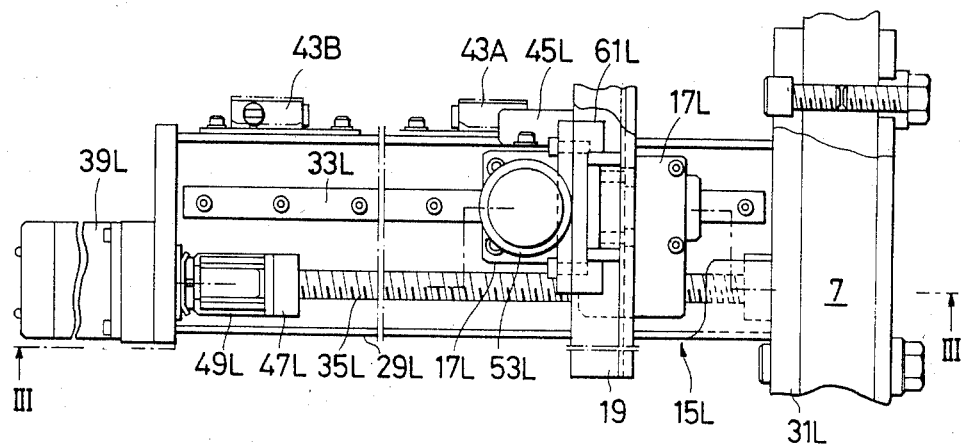
FIG. 2 is an enlarged sectional view taken along the line II—II in FIG. 1.

With reference to FIG. 1, a press brake 1 is illustrated in this embodiment of the present invention in the form of a metal plate working device in which a workpiece W of metal plate is processed. The press brake 1 is comprised of two C-type left and right side frames 3L and 3R, which are separated and installed on the left and the right, along with an upper frame 5 which is supported at the upper portion of the side frames 3L and 3R, and a lower frame 7 which is supported at the lower portion of the side frames 3L and 3R. Mounted on the lower portion of the upper frame 5 is an upper tool 9 such as, for example, a punch positioned in the left to right direction, and mounted on the upper section of said lower frame 7 is a lower tool 11 such as a die which processes the workpiece W in cooperation with the upper tool 9. As is commonly understood, on the press brake 1, the upper frame 5 or the lower frame 7, whichever is appropriate, is raised and lowered, so that the folding of the workpiece W is carried out by means of the engagement between the upper tool 9 and the lower tool 11, and in the rear direction of the work position formed by the upper tool 9 and the lower tool 11, a backgauge device 13, which carries out the pre-determined positioning of the workpiece W, is installed.

As has already been made clear, an example of the backgauge device 13 of the press brake 1 is given for this embodiment of the present invention, however, it should be understood that the backgauge device 13 is not limited to the press brake 1, but is also capable of being applied for other plate metal working devices such as shearing machines.

As has already been made clear in FIG. 1, the backgauge device 13 is constructed so that it is capable of carrying out the positioning of the workpiece W in the forward and backward direction. That is to say, two left and right guide devices 15L and 15R, constructed so that they are aligned in the forward and backward direction on the back surface of the lower frame 7, are installed such that they are separated horizontally left and right. On the side devices 15L and 15R, movable bodies 17L and 17R are respectively guided and supported such that they are freely movable in the forward and backward direction. The movable bodies 17L and 17R support a beam member 19 near the opposite ends thereof, which beam member is extended in the left and right directions. On the beam member 19 a plurality of work stopper devices 21L and 21R are installed such that they are freely adjustable, with regard to position, in the left and right directions. Furthermore, when the beam member 19 is long, the movable members 17L and 17R support the beam member 19 not near the opposite ends thereof, but at portions remote from the opposite ends so as to prevent the beam member 19 from bending as a result of its dead load. By means of the above configuration, the left and right movable bodies 17L and 17R, by suitably moving in the forward and backward direction, can movably position the beam member 19 in the forward and backward direction. Accordingly, after the positioning of the beam member 19 in the forward and backward direction has been carried out, it becomes possible to carry out the positioning of the workpiece W in the forward and backward direction by means of contact between the rear end of the workpiece W and butting members 23L and 23R which are provided on the work stopper devices 21L and 21R which are supported on the beam member 19.

A detailed illustration has been omitted, however, the butting members 23L and 23R provided on the work stopper devices 21L and 21R, are rotatably supported in a vertical direction through the medium of hinge pins 27L and 27R by elevating bodies 25L and 25R which are installed so that they are vertically movable and vertically adjustable on the work stopper devices 21L and 21R. The rotatable motion of the butting devices 23L and 23R in the upward direction, can be carried out automatically, for example, by means of a configuration in which a suitable plunger pushes down the butting devices 23L and 23R at the base side edge thereof, or by means of a suitable mechanism in which the rotation of the hinge pins 27L and 27R is carried out by means of a rack and pinion mechanism. In addition, the vertical movement of the elevating bodies 25L and 25R, can be carried out automatically by means of a multi-cylinder comprising a plurality of air cylinders or hydraulic cylinders arranged in series or by means of thread mechanisms.

Accordingly, on the work stopper devices 21L and 21R, it is capable of aligning the height of the butting members 23L and 23R at the height of the rear end of the workpiece W by means of vertically moving the elevating bodies 25L and 25R, even, for example, in the case where the rear end of the workpiece W is formed in an almost Z-shaped stepped-form.

In addition, at the time, for example, of the folding of the workpiece W, any worries that the rear end of the workpiece W w11 interfere with the butting members 23L and 23R, or similar worries, can be alleviated by causing the butting members 23L and 23R to rotate in the upward direction.

With reference to FIGS. 1–4, one of the guide devices, 15L, is constructed such that one of the movable members, 17L, which suitably supports one edge of the beam member 19 is automatically moved and positioned in the forward and backward direction. That is to say, the front edge of a base member 29L, which extends in the forward and backward direction and has its cross-section formed as a channel, is mounted on the back face of the bottom frame 7 by means of a bracket 31L. A guide member 33L, which extends in the forward and backward direction, is mounted on this base member 29L, and at the same time a threaded rod 35L, extending parallel to the guide member 33L, is supported in a freely rotatable manner by means of bearings. The previously mentioned movable body 17L is supported in a freely movable manner on the above-mentioned guide member 33L, and a nut member 37L, which is integrally connected with the movable body 17L, is threaded onto the threaded rod 35L.

Accordingly, by suitably rotating the threaded rod 35L, the movable body 17L is moved in the forward and backward direction parallel to the guide member 33L, by means of the nut member 37L. As a result, the beam member 19 which is suitably supported by the movable body 17L, is made to move in the forward and backward direction, and the movement and positioning of the work stopper mechanisms 21L and 21R in the forward and backward direction becomes possible.

In order to carry out the movement and positioning of the movable body 17L automatically in the forward and backward direction, a rotational drive device 39L, such as a pulse motor or servomotor, for example, is operatively connected to the previously mentioned threaded rod 35L. In this embodiment of the present invention, the rotational drive device 39L is mounted on the back end of the base member 29L, and an output shaft 41L of this rotational drive device 39L is operatively connected to the threaded rod 35L. Accordingly, the movable body 17L is automatically moved in the forward and backward direction by the suitable rotation of the rotational drive device 39L. When the movable body 17L is moved in the forward and backward direction, it is possible to use a suitable position-detecting mechanism, with a configuration by which, for example, the threaded rod 35L or the rotational drive device 39L, is operatively connected to a pulse encoder or the like. A suitable linear scale, such as a magnetic scale, can be provided parallel to the guide member 33L, as a mechanism to detect the moving position in the forward and backward direction of the movable body 17L. By using a position detecting mechanism, and carrying out feed back control, it is possible to precisely carry out the movement and positioning of the movable member 17L.

In order to regulate the forward and backward limits of the movable member 17L, two sensors 43A and 43B, such as limit switches, are installed near the front edge and back edge of the base member 29L respectively, and a dog 45L is mounted on the movable body 17L to activate the sensors 43A and 43B. When the sensors 43A and 43B are activated by the dog 45L, the movable body 17L detects that the movable limit in the forward or backward direction has been reached, and acts to halt the rotation of the previously mentioned rotational drive device 39L.

Accordingly, any over-run by the movable body 17L in the forward or backward direction can be prevented by the action of the sensors 43A and 43B. However, in order to even more precisely impede the movement of the movable body 17L beyond the limits in the forward and backward direction, a bracket 49L which supports an elastic member 47L, formed from, for example, rubber or the like, is mounted near the back edge of the base member 29L, and an elastic member 51L is mounted near the front edge. The elastic members 47L and 51L freely contact the nut member 37L integral with the movable body 17, whereby, when the nut member 37L is contacted, the shock is absorbed, and the movement of the nut member 37L is impeded. Accordingly, even in the case where the sensors 43A and 43B make inadequate contact when the movable body 17L and the like move in the forward and backward direction, it is capable of preventing any adverse consequences resulting from movement in the forward and backward direction exceeding the limit of movement.

The configuration of the guide device 15R is almost identical to that of the previously discussed guide device 15L, so that a structural member fulfilling an identical function is indicated by appending an R to the identical reference number, and a detailed explanation is omitted.

As has already been understood, the left and right movable bodies 17L and 17R will move in the forward and backward direction on the left and right devices 15L and 15R, as the result of a rotational motion instruction to both of the rotational drive devices 39L and 39R. Accordingly, it is possible to movably position the work stopper devices 21L and 21R in the left and right direction, for example, by supporting the beam member 19 substantially parallel to the lower tool 11. In addition, as required, by giving movement instructions for a different number of rotations individually to the rotational drive devices 39L and 39R, different positions are obtained in the forward and backward direction for the left and right movable bodies 17L and 17R, and it is possible to obtain a slanted position in the forward and backward direcion for the beam member 19.

Figure 3:
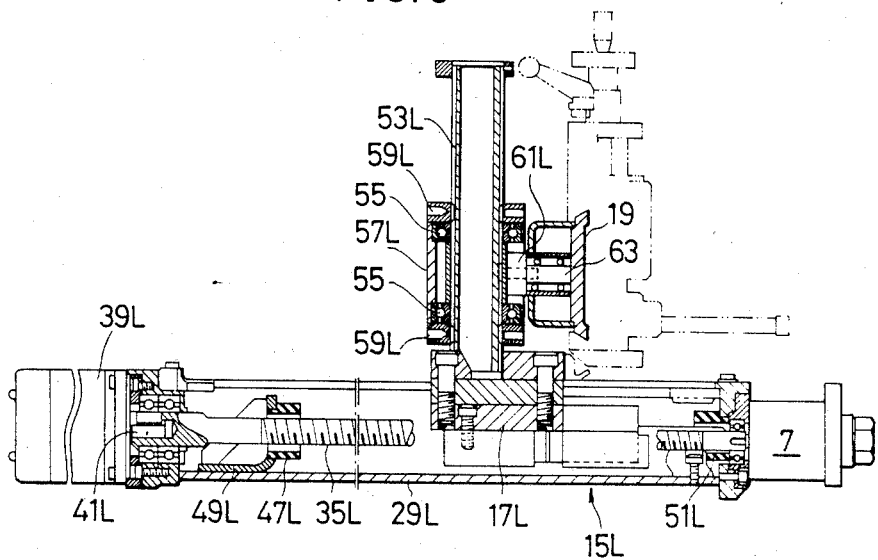
FIG. 3 is a sectional view taken along the line III—III of FIG. 2.
Figure 4:
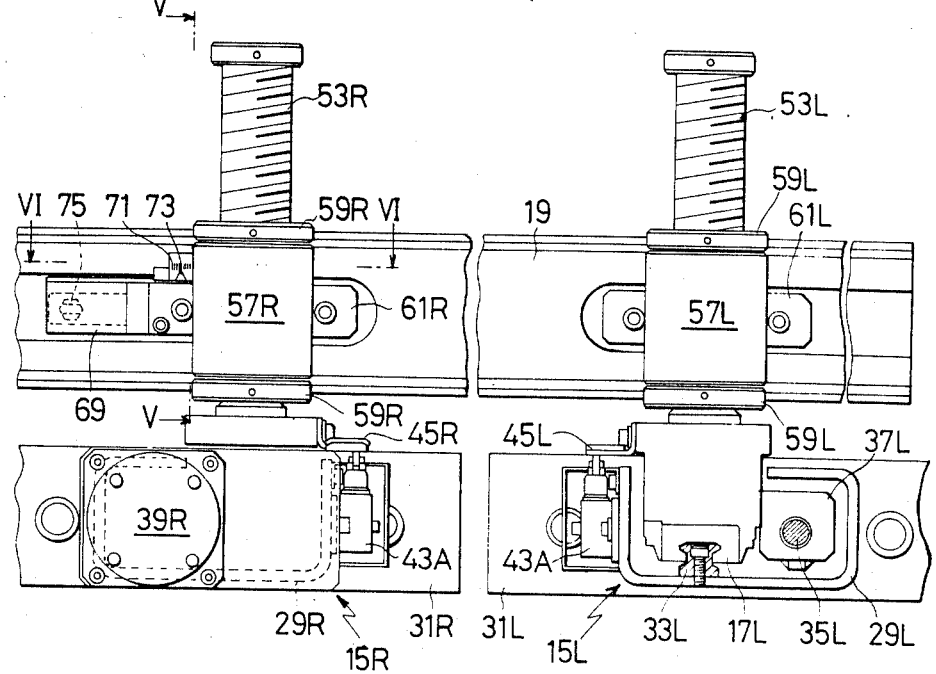
FIG. 4 is an enlarged sectional view taken along the line IV—IV in FIG. 1.
Figure 5:
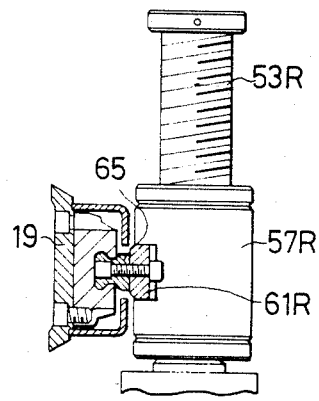
FIG. 5 is a sectional view taken along the line V—V of FIG. 4.

That is to say, the beam member 19 is supported by the forward and backward movable bodies 17L and 17R in a way that makes it possible to position the beam member 19 at an angle in the left and right direction. To explain in more detail, as illustrated in FIG. 3 to FIG. 5, screw posts 53L and 53R are vertically installed on the upper section of the left and right movable bodies 17L and 17R, and on each of the screw posts 53L and 53R, tubular bodies 57L and 57R are rotatably supported through a plurality of bearings 55. The positions of the tubular bodies 57L and 57R in the vertical direction are regulated by means of upper and lower nut members 59L and 59R which are threaded onto each of the screw posts 53L and 53R. Accordingly, each of the nut members 59L and 59R are made to rotate and move in the vertical direction to adjust the tubular bodies 57L and 57R to a suitable height.

As illustrated in detail in FIG. 3 and FIG. 4, brackets 61L and 61R are aligned respectively in the left and right direction and mounted integrally to each of the above-mentioned tubular bodies 57L and 57R, and a horizontal shaft 63 is suitably mounted on one of the brackets, 61L. One end of the beam member 19 is supported vertically rotatably on the shaft 63. In addition, a sliding guide 65 is aligned horizontally in the left and right direction and mounted integrally to the other bracket 61R, and the other end of the beam member 19 is slidably supported on the slide guide 65. That is to say, the beam member 19 is vertically adjustably and horizontally and vertically rotatably supported in relation to one screw post 53L, and vertically adjustably, horizontally rotatably and longitudinally slidably in relation to the other screw post 53R.

As can be understood by means of the configuration outlined above, the beam member 19 is freely adjustable with respect to position in the vertical direction, and it is capable of accommodating both the slant in the vertical direction of the beam member 19 when the adjustment of the position of the beam member 19 is being carried out by vertical movement, and the winding action of the guide members 33L and 33R (the fluctuation of the screw posts 53L and 53R in the left and right direction) as a result of the winding of the lower surface of the base members 29L and 29R, by means of the rotational action in the vertical direction around the shaft 63, and by means of the sliding action in the longitudinal direction in relation to the slide guide 65. Accordingly, even when, for example, the accuracy of the installation of the guide members 33L and 33R is so poor in relation to the base members 29L and 29R that the screw posts 53L and 53R are slightly slanted at the time of the movement of the movable members 17L and 17R which are supported and guided by the guide members 33L and 33R, the slant of the screw posts 53L and 53R can be absorbed. Accordingly, it is possible to cope with positioning problems even in the case where the accuracy of the installation of the left and right guide members 33L and 33R is more or less poor. In addition, for the base members 29L and 29R, it is not essential that the mounting surface of the guide members 33L and 33R be accurately processed, but a simple non-bending construction is sufficient. In other words, in comparison with conventional units, the mounting of the guide members 33L and 33R to the base members 29L and 29R becomes very simple, and it is not necessary that the base members 29L and 29R be strongly constructed for working, and consequently they can be of an exceedingly light-weight construction.

In addition, as a result of the fact that the tubular bodies 57L and 57R which support the beam member 19 are freely rotatable in relation to the left and right screw posts 53L and 53R and, as a result of the fact that it is possible for the beam member 19 to slide in the longitudinal direction in relation to the slide guide 65, the beam member 19 is capable of slanting in the forward and backward direction. Accordingly, it is obvious that it is possible to cause the beam member 19 to slant intentionally in the forward and backward direction, and, for example, when an instruction is given simultaneously to the left and right movable members 17L and 17R to rotate for movement in the forward and backward direction, even if one of the movable members 17L and 17R is slightly delayed, the desired results can be achieved. That is to say, even if there is a delay in the synchronism of the movable bodies 17L and 17R at the time of movement, it is possible to obtain accurate positioning of the beam member 19 when finally both of the movable bodies 17L and 17R become accurately positioned.

In addition, because the left and right movable bodies 17L and 17R are made to move by means of the separate rotational drive devices 39L and 39R, it is possible to fabricate each of the rotational drive devices 39L and 39R in a comparatively small size, and together with providing a light, compact supporting construction, the movement of the movable bodies 17L and 17R can be speeded up because of their low inertia. In addition, in this embodiment of the present invention, the beam member 19 is constructed so that in relation to the one screw post 53L it is freely adjustable with regard to vertical position and supported in a freely pivotable manner in both the horizontal and vertical directions, while in relation to the other screw post 53R it is freely adjustable with regard to vertical position, horizontally pivotable, and supported in the longitudinal direction in a freely slideable manner. However, it would be further desirable if the beam member 19 was constructed so that, in relation to the other screw post 53R, it was freely adjustable with regard to vertical position, and freely pivotable horizontally, and also freely pivotable in the vertical direction, as well as being supported so that it was freely slidable in the longitudinal direction.

Figure 6:
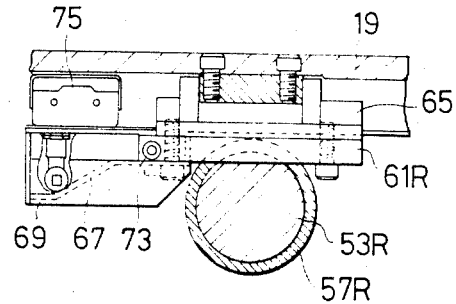
FIG. 6 is a sectional view taken along the line VI—VI of FIG. 4.

With reference to FIG. 4 and FIG. 6, a bracket 69 provided with a cam 67 which is slanted in the forward and backward direction, is integrally mounted on the previously discussed bracket 61R, and a scale 71 provided for the beam member 19 and a corresponding pointer 73 are mounted on the bracket 69.

In addition, a detection device 75, such as a limit switch activated by the cam 67, is mounted on the previously discussed beam member 19. When the beam member 19 is parallel to the lower tool 11, the above-mentioned pointer 73 indicates the zero point, and when the beam member 19 slants in the forward and backward direction, the scale position corresponding to the angle of inclination is indicated. Accordingly, by reading the point on the scale indicated by the pointer 73, the angle of inclination of the beam member 19 in the forward and backward direction is known.

In addition, when the beam member 19 is slanted at a large angle in the forward and backward direction, the previously mentioned detection device 75 makes contact with the cam 67 and is engaged with and activated by the cam 67. Accordingly, by the activation of the detection device 75, the fact that the beam member 19 is inclined at a large angle in the foward and backward direction can be detected, and any inconvenience caused by the beam member inclined unnecessarily largely can be prevented.

As has already been explained, as a result of the present invention, the manufacture of a backgauge has been simplified, and as well as making it possible to form the entire unit in light-weight construction, it also becomes possible to slant the unit in the forward and backward direction if required.

Furthermore, the invention being thus described, it will be obvious that the same may be varied in many ways. Such variations are not to be regarded as a departure from the spirit and scope of the invention, and all such modifications are intended to be included within the scope of the following claims.

What is claimed is:

1. A backgauge device, comprising:
   an upper frame member which supports an upper tool;
   a lower frame member which supports a lower tool which carries out the processing of a workpiece in cooperation with the upper tool;
   a plurality of guide members extending transversely from the back position of one of said upper frame and said lower frame, said guide members being installed such that they are separated from each other, each said guide member being provided with a movable body supported thereon which is movable in the direction of the guide members, and individually provided with a drive mechanism which drives individually the respective movable body;
   a work stopper for a butting against the workpiece; and
   a beam member extending transversely to the guide members for supporting the work stopper one end of the beam member horizontally pivotably supported on one of said movable bodies and the other end of the beam member horizontally pivotably supported on and longitudinally slidable with respect to the other movable body;
   wherein said movable bodies are capable of individual movement along their respective guide members such that the angle of the beam member with respect to the upper and lower tools may be adjusted.

2. The backgauge device of claim 1, wherein one movable body supports one edge of said beam member in a vertically pivotable manner, and the other movable body supports the other edge of said beam member in a longitudinally slidable manner.

3. The backgauge device of claim 1, wherein one movable body supports one edge of said beam member in a vertically pivotable manner, and the other movable body supports the other edge of said beam member in a longitudinally slidable and horizontally pivotable manner.

4. The backgauge device of claim 1, wherein one movable body supports one edge of said beam member in a vertically and horizontally pivotable manner, and the other movable body supports the other edge of said beam member in a longitudinally slidable and horizontally pivotable manner.

5. The backgauge device of claim 1, wherein a detection device is provided on the other edge of said beam member to detect excessive longitudinal sliding of said beam member relative to said movable body.

6. The backgauge device according to claim 1, wherein the beam member is individually vertically adjustably supported by each of said movable bodies.

7. A backgauge device, comprising:
   a plurality of guide members extending substantially parallel to one another;
   a movable body supported on each guide member so as to be movable in the direction of the guide member;
   drive means for independently moving each movable body along its respective guide member;
   a longitudinal beam member extending transversely to the guide members, one end of the beam member horizontally pivotably supported on one of said movable bodies and the other end of the beam member horizontally pivotably supported on and longitudinally slidable with respect to the other movable body; and a work stopper mounted on the beam for abutting against a workpiece;

the movable bodies being vertically adjustable independently of each other so that the height of opposite longitudinal ends of the beam member can be varied with respect to each other.

8. The backgauge device according to claim 7, wherein each of the movable bodies comprises a vertical screw post and a nut member for adjusting the vertical height of the beam member.

9. The backgauge device according to claim 7, further comprising a plurality of work stopper devices mounted on the beam member.

10. The backgauge device according to claim 9, further comprising a butting member pivotally mounted to each work stopper device, said butting member being pivotable from a horizontal to a vertical position.

11. The backgauge device according to claim 7, further comprising cam means for limiting travel of the movable bodies along the guide members.

12. The backgauge device according to claim 7, further comprising a horizontal shaft mounted to one of the movable bodies and one end of the beam member being supported vertically rotatably on the shaft.

* * * * *